United States Patent [19]

Babcock

[11] Patent Number: 4,678,218

[45] Date of Patent: Jul. 7, 1987

[54] SALT BLOCK CARRIER

[76] Inventor: Lowell C. Babcock, 22014 Anthony Rd., Marengo, Ill. 60152

[21] Appl. No.: 871,375

[22] Filed: Jun. 6, 1986

[51] Int. Cl.⁴ .............................................. B65G 7/12
[52] U.S. Cl. ....................................... 294/16; 294/106
[58] Field of Search ................ 294/4, 15, 16, 26, 27.1, 294/28, 31.1, 62, 106, 110.1, 116, 118, 158, 164, 165, 169, 170, 902, 903

[56] References Cited

U.S. PATENT DOCUMENTS

| 153,287 | 7/1874 | Toselli | 294/110.1 |
|---|---|---|---|
| 674,944 | 5/1901 | Stinchcomb | 294/116 |
| 679,183 | 7/1901 | McKee | 294/106 |
| 693,097 | 2/1902 | Baldwin | 294/4 |
| 698,730 | 4/1902 | McMasters | 294/116 |
| 918,159 | 4/1909 | Jenkins | 294/116 |
| 1,429,813 | 9/1922 | Watts | 294/118 |
| 1,527,939 | 2/1925 | Van Every | 294/116 |
| 1,806,956 | 5/1931 | Smith | 294/16 X |
| 2,623,768 | 12/1952 | Grieve | 294/16 |
| 2,828,155 | 3/1958 | Schwankl | 294/16 |
| 2,829,917 | 4/1958 | Wiora | 294/106 X |
| 2,853,336 | 9/1958 | Cruikshank et al. | 294/115 |
| 3,189,937 | 6/1965 | Sciortino | 294/33 |
| 3,736,018 | 5/1973 | Sayre, Jr. et al. | 294/106 X |
| 3,804,453 | 4/1974 | Walden | 294/106 X |
| 4,262,952 | 4/1981 | Bradley | 294/116 |

FOREIGN PATENT DOCUMENTS 76401 10/1930 Sweden .................... 294/16

Primary Examiner—Johnny D. Cherry
Attorney, Agent, or Firm—Mathew R. P. Perrone, Jr.

[57] ABSTRACT

A salt block carrier includes a handle with a pair of pivotally mounted arms movably secured to the handle. The arms each have an end designed to fit and hold the salt block with blunt gripping knobs.

18 Claims, 5 Drawing Figures

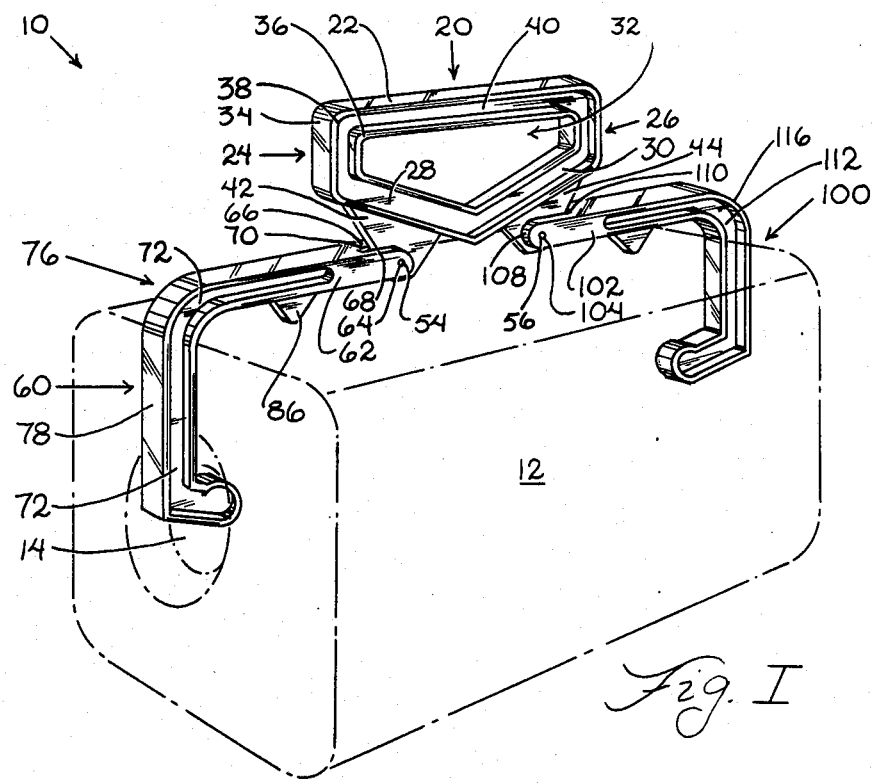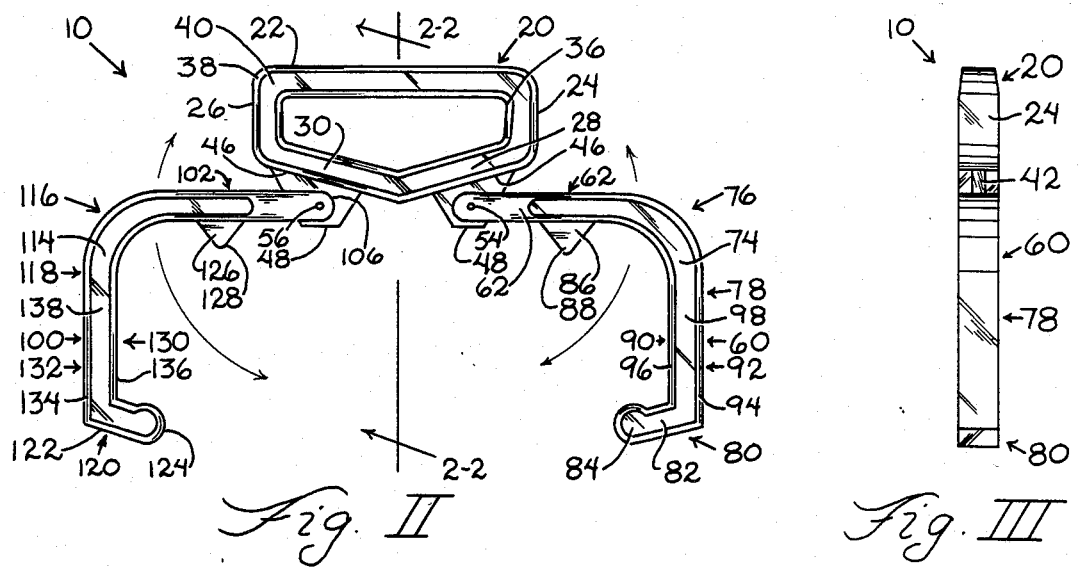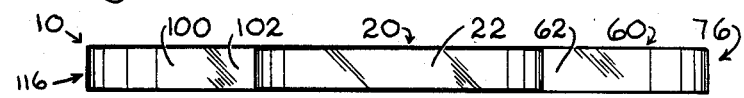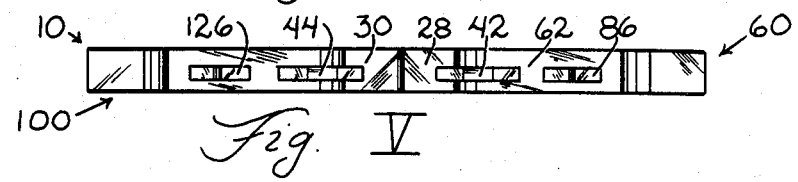

SALT BLOCK CARRIER

BACKGROUND OF THE INVENTION

This invention relates to a carrier suitable for lifting a block of material, and more particularly to a carrier for lifting a block of salt.

One particularly arduous task is the handling of large salt blocks. It is always desirable to simplify work that must be done. These blocks are handled by cattle feeders and by home owners. The cattle feeders handle the blocks because the salt is a necessary, nutritional element in the raising of the cattle. It is always desirable to put out the salt blocks for the cattle to lick. To do this requires lifting and handling of salt blocks.

The homeowner uses the salt blocks in a water softener. The salt block also is the more efficient way to use salt in a water softener. Nevertheless, the salt block is not favored by the homeowner because of its bulkiness and its difficulty to handle. It thus becomes desirable to provide a device permitting simplified handling of salt blocks.

Grippers are known for grabbing blocks of material. Some of these grippers are too sharp and cut the salt block when used therewith. Other grippers do not have a simplified release mechanism. Still other grippers are heavy and cumbersome to use. Such grippers do not overcome the problems or simplify and reduce the effort required to lift or otherwise maneuver a salt block.

The desirability of developing a device suitable for lifting or otherwise handling a salt block thus becomes extremely clear.

If a lighter weight gripper can be successfully developed, sufficient strength must be maintained to handle the weight of the salt block. It is difficult to maintain the strength to handle the weight of the salt block while at the same time providing a device which can be easily released from the salt block. Thus, problems abound in developing a device to handle a salt block.

SUMMARY OF THE INVENTION

Therefore, it is an object of this invention to provide a device for lifting a salt block.

A further object of this invention is to provide a device which minimizes damage to the salt block.

A still further object of this invention is to provide a device which is easily released from a salt block.

Yet a further object of this invention is to provide a device which is more simple to operate.

Also an object of this invention is to provide a device which is not cumbersome to operate.

Another object of this invention is to provide a light weight device capable of lifting a salt block.

These and other objects of the invention are met by providing a device for lifting a salt block including a handle and pivotally mounted arms designed to fit the salt block with blunt gripping knobs.

BRIEF DESCRIPTION OF THE DRAWING

FIG. I is perspective view of the front of salt block carrier 10 in contact with salt block 12.

FIG. II is a plan, reverse view of FIG. I.

FIG. III is an end view of FIG. II.

FIG. IV is a top view of FIG. III.

FIG. V is a bottom view of FIG. II.

Throughout the Figures of drawing where the same part appears in more than one Figure of the drawing, the same numeral is applied thereto.

DESCRIPTION OF THE PREFERRED EMBODIMENTS

A salt block carrier has a handle having two arms secured thereto at one end and having gripping knobs at the other end of each arm, which knobs fit onto a salt block; and is easily released from the salt block as desired.

Referring now to FIGS. I and II, salt block carrier 10 is depicted in contact with a salt block 12. Standardly, salt blocks such as salt block 10 are symmetrical and have salt indentations 14. The salt indentation 14 is matched by an equivalent indentation on the side of the salt block 12 oppositely disposed therefrom and not visible.

Each of the indentations 14 is a recess into the block 12 and is a standard feature of salt block 12 commonly used in water softeners and cattle feeding. Indentations 14 provide for an easy mold release after the salt block has been molded or otherwise shaped. Indentations 14 receive salt block carrier 10 and provide for gripping of the salt block 12.

Salt block carrier 10 includes handle 20, and first arm 60 and second arm 100 secured to handle 20. Handle 20 has a grip area 22 which is generally the portion of handle 20 in contact with the hand of a person using the salt block carrier 10. Adjacent grip area 22 at one end thereof is a first handle side 24. Opposite first handle side 24 and substantially symmetrical thereto is a second handle side 26. Grip area 22 naturally extends into first handle side 24 and second handle side 26 as a matter of course.

In a preferred fashion, first handle side 24 and second handle side 26 are generally in a arcuate right angle position relative to grip area 22. First handle base 28 is an extension of first handle side 24 and joins second handle base 30. Second handle base 30 is clearly an extension of second handle side 26. Thus, in the preferred form as shown handle 20 is of a generally pentagonal shape with two adjoining arcuate right angles. Handle interior 32 is generally the area through which the hand is inserted for the purpose of operating the salt block carrier 10. Handle exterior 34 is, of course, the oppositely disposed and outside portion of handle 20.

In a preferred design form, handle 20 includes an interior flange 36 on handle interior 32 in a flattened and rounded edge shape. Likewise, exterior flange 38 is similar to interior flange 36 and oppositely disposed therefrom. Thus, exterior flange 38 is at handle exterior 34. Flange base 40 is generally between interior flange 36 and exterior flange 38 in a substantially perpendicular fashion such that an I-beam type shape is achieved. This structure provides strength for handle 20, and provides for comfort in lifting because of the flattened and rounded-edge nature of handle interior 32.

On handle exterior 34 and first handle base 28 is a first base arm mount 42. Similarly on handle exterior 34 and second handle base 30 is a second base arm mount 44. First base arm mount 42 and second base arm mount 44 are substantially symmetrical.

Both first base arm mount 42 and second arm mount 44 have a mount base 46. Each mount base 46 is secured by molding or other suitable fashion to the respective first handle base 28 and second handle base 30. Mount top 48 is oppositely disposed from mount base 46 and gives first base arm mount 42 and second base arm mount 44 its generally quadrilateral shape.

Within first base arm mount 42 is a first base aperture (not shown). Similarly, a second base aperture (not shown) is within second base arm mount 44. First arm rod 54 passes through the first base aperture to secure first arm 60 thereto. By the same token second arm rod 56 passes through the second base aperture to secure second arm 100 to handle 20.

First arm 60 includes a first apertured end 62 having a first arm aperture 64. First arm aperture 64 protrudes through first arm base 66 and first arm holder 68 to thereby form first arm slot 70. First arm holder 68 and first arm base 66 provide first arm slot 70 for receiving first base arm mount 42. First arm aperture 64 aligns with the first base aperture between first arm holder 68 and first arm base 66. First arm rod 54 is then slidably and frictionally inserted through first arm aperture 64 and the first base aperture to secure first arm 60 to handle 20 at first base arm mount 42.

First arm 60 further includes adjacent to first arm slot 66 a first arm groove 72. First arm groove 72 extends throughout first arm 60 down to first arm grip 80. First arm valley 74 is similar to first arm groove 72 down the opposite side of first arm 60. First arm holder 68 is on the same side as first arm groove 72. First arm base 66 is on the same side as first arm valley 74. However, first arm valley 74 is a mirror image of first arm groove 72.

First arm arch 76 permits first apertured end 62 to extend into first arm side 78. Generally first arm arch 76 is a 90 degree arch permitting first arm side 78 to be perpendicular to first apertured end 62. First arm side 78 extends downwardly into first arm grip 80. First arm grip 80 is at an obtuse angle with first arm side 78.

First arm grip 80 includes a first grip base 82 and a first grip knob 84. First grip base 82 is the extension at the obtuse angle of first arm side 78. First grip knob 84 is a rounded and enlarged end of first arm grip 80. The rounded and enlarged first grip knob 84 permits gripping of the salt block 12 in the salt indentations 14.

On first apertured end 62 is a first arm release 86. First arm release 86 is triangular in shape and has a first arm vertex 88 extending out from first apertured end 62. First arm 60 includes a first arm interior 90 within which the salt block is held. Oppositely disposed from first arm interior 90 is first arm exterior 92. First arm exterior 92 includes first arm exterior flange 94. First arm flange 94 permits a flattened appearance for first arm 60 similar to the flange of handle 20 caused by exterior flange 38. First arm interior 90 includes first arm interior flange 96 which is flattened therein on the interior 90 of salt block carrier 10. First flange connector 98 connects first arm exterior flange 94 and first arm interior flange 96 to form an I beam style cross-section.

In this fashion, a decorative, strong and useful salt block carrier 10 is depicted. The first arm release 86 contacts the salt block 12 when the handle 20 has approached the salt block 12 due to downward pressure on the handle 20. As the handle 20 is pressed downwardly, first arm release 86 contacts the salt block forcing first arm 60 to rotate about first arm rod 54 in an upward direction thereby releasing salt block carrier 10 from the salt block 12. Second arm 100 functions similarly.

Second arm 100 includes a second apertured end 102 having a second arm aperture 104. Second arm aperture 104 protrudes through second arm base 106 and second arm holder 108 to thereby form second arm slot 110. Second arm holder 108 and second arm base 106 provide the second arm slot 110 for receiving second base arm mount 44. Second arm aperture 104 aligns with the second base aperture in second base arm mount 44 between second arm holder 108 and second arm base 106. Second arm rod 56 is then slidably and frictionally inserted through second arm aperture 104 and the second base aperture to secure second arm 100 to handle 20 at second base arm mount 44.

Second arm 100 further includes adjacent to second arm slot 110 a second arm groove 112. Second arm groove 112 extends throughout second arm 100 down to second arm grip 120. Second arm valley 114 is similar to second arm groove 112 down the opposite side of second arm 100. Second arm holder 108 is on the same side as second arm groove 112. Second arm base 106 is on the same side as second arm valley 114. However, second arm valley 114 is a mirror image of second arm groove 112.

Second arm arch 116 permits second apertured end 102 to extend into second arm side 118. Generally second arm arch 116 is a 90 degree arch permitting second arm side 118 to be perpendicular to second apertured end 102. Second arm side 118 extends downwardly into second arm grip 120. Second arm grip 120 is at an obtuse angle with second arm side 118.

Second arm grip 120 includes a second grip base 122 and a second grip knob 124. Second grip base 122 is the extension at the obtuse angle of second arm side 118. Second grip knob 124 is a rounded and enlarged end of second arm grip 120. The rounded and enlarged knob permits gripping of the salt block 12 in the salt indentations 14.

On second apertured end 102 is a second arm release 126. Second arm release 126 is triangular in shape and has a second arm vertex 128 extending out from second apertured end 102. Second arm 100 includes a second arm interior 130 within which the salt block is held. Oppositely disposed from second arm interior 130 is second arm exterior 132. Second arm exterior 132 includes second arm exterior flange 134. Second arm exterior flange 134 permits a flattened appearance for second arm 100 similar to the flange of handle 20 caused by exterior flange 38. Second arm interior 130 includes second arm interior flange 136 which is flattened therein on the interior 130 of salt block carrier 10. Second flange connector 138 connects second arm exterior flange 134 and second arm interior flange 136 to form an I beamed style cross-section.

In this fashion, a decorative, strong and useful salt block carrier 10 is depicted. The second arm release 126 contacts the salt block 12 when the handle has approached the salt block 12 due to downward pressure on the handle 20. As the handle 20 is pressed downwardly, second arm release 126 contacts the salt block 12 forcing second arm 100 to rotate about second arm rod 56 in an upward direction thereby releasing salt block carrier 10 from the salt block 12.

Referring now to FIG. III, handle 20 is shown from a side view. First base arm mount 42 is depicted as a narrower portion of handle 20. First arm 60 is connected thereto.

Referring now to FIG. IV, a top view of salt bock carrier 10 is depicted. In this fashion, handle 20 and more particularly grip 22 of handle 20 is shown along with first arm 60 and second arm 100. More particularly first apertured end 62 of first arm 60 is shown in a top view and second apertured end 102 is shown in a top view. It is clear that first arm 60 and second arm 100 are symmetrical. It is also clear that salt block carrier 10 has an axis of symmetry along Line 2—2.

Referring now to FIG. V, a bottom view of salt block carrier 10 is depicted. From the bottom view, handle 20 is seen and more particularly first handle base 28 and second handle base 30. Also, a bottom view of the salt block first arm 60 and second arm 100 are seen. Clearly visible also are the first arm release 86 and the second arm release 126. In this fashion, the structure of the salt block carrier is depicted.

In operation, salt block carrier 20 is placed to show that first grip knob 84 and second grip knob 124 contact oppositely disposed salt block indentations 14. First arm 60 and second arm 100 are pressed so that first grip knob 84 and second grip knob 124 are within the indentations. Due to the presence of first grip knob 84 and second grip knob 124, lifting of the salt block 12 by handle 20 becomes feasible. The first grip knob 84 and second grip knob 124 cause the gripping of salt block 12 as handle 20 is pulled then in an upward direction at grip area 22. In order to release salt block carrier 20, one merely needs to press down on handle 20 in order to have first arm release 86 and second arm release 126 contact the salt block and push first arm 60 and second arm 100 in an outward direction. In this manner, salt block carrier 20 is released from the salt block 10.

Any material having the desired shaping characteristics and lightweight strength capabilities may be used to form salt block carrier 10 of this invention. A preferred material is a moldable plastic or synthetic resin having the required strength and stiffness characteristic for the desired purpose. Typically, a moldable thermosettable resin is used. Even a metal or metallic alloy may be used if the desired lightweight strength characteristic can be met. Combinations of metal and resin or plastic may also be used.

What is claimed and to be secured by Letters Patent of the United States is:

1. A salt block carrier for holding a salt block including a handle, and a first movable arm secured to said handle and a second movable arm secured to said handle, wherein:
   a. said first movable arm includes a first securing end for movably securing said first movable arm to said handle;
   b. said first movable arm includes a first knobbed end for contacting said salt block oppositely disposed from said first securing end;
   c. said second movable arm includes a second securing end for movably securing said second movable arm to said handle;
   d. said second movable arm includes a second knobbed end for contacting said salt block oppositely disposed from said second securing end;
   e. a first release means for releasing said first movable arm from said salt block;
   f. a second release means for releasing said second movable arm from said salt block;
   g. said handle includes a grip area, said grip area being generally the portion of said handle in contact with a hand of a person using said salt block carrier;
   h. a first handle side is at one end of said grip area;
   i. a second handle side is oppositely disposed from said first handle side at an opposing end of said grip area;
   j. said grip area extends into said first handle side and said second handle side;
   k. said first handle side extends into a first handle base;
   l. said second handle side extends into a second handle base;
   m. said first handle base and said second handle base meet to complete said handle in cooperation with said first handle side, said second handle side, and said grip area;
   n. said handle has a handle exterior and a handle interior oppositely disposed from said handle exterior;
   o. said first handle base includes a first base arm mount on said handle exterior; and
   p. said second handle base includes a second base arm mount on said handle exterior.

2. The salt block carrier of claim 1, wherein:
   a. said handle is shaped substantially pentagonally;
   b. said first handle side is at substantially an arcuate right angle with said grip area;
   c. said second handle side is at substantially an arcuate right angle with said grip area;
   d. an angle between said first handle base and said second handle base is greater than 90°; and
   e. an angle between said first handle base and said first handle side is greater than 90°.

3. The salt block carrier of claim 2, wherein:
   a. said handle has an I-beam cross-section;
   b. said handle has an exterior flange at said handle exterior;
   c. said handle has an interior flange at said handle interior; and
   d. said exterior flange is substantially parallel to said interior flange.

4. The salt block carrier of claim 3, wherein:
   a. said first securing end includes a first arm holder and a first arm base to form a first arm slot to receive therebetween said first base arm mount in a secured fashion; and
   b. said second securing end includes a second arm holder and a second arm base to form a second arm slot to receive therebetween said second base arm mount in a secured fashion.

5. The salt block carrier of claim 4, wherein:
   a. said first arm holder and said first arm base both include a first arm aperture having a first common axis;
   b. said first base arm mount includes therein a first handle aperture;
   c. said first arm aperture has said first common axis capable of aligning with said first handle aperture;
   d. said second arm holder and said second arm base both include a second arm aperture having a common axis;
   e. said second base arm mount includes therein a second handle aperture;
   f. said second arm aperture has said second common axis capable of aligning with said second handle aperture;
   g. a first arm rod is slidably inserted through and secured in said first arm aperture and said first handle aperture; and
   h. a second arm rod is slidably inserted through and secured in said second arm aperture and said second handle aperture.

6. The salt block carrier of claim 5, wherein:

a. said first arm includes a first arm groove adjacent to said first arm slot;
b. said first arm groove extends throughout said first arm down to said first knobbed end;
c. said first arm includes a first arm valley adjacent to said first arm slot;
d. said first arm valley is oppositely disposed from and substantially similar to said first arm slot;
e. said second arm includes a second arm groove adjacent to said second arm slot;
f. said second arm groove extends throughout said second arm down to said second knobbed end;
g. said second arm includes a second arm valley adjacent to said second arm slot; and
h. said second arm valley is oppositely disposed from and substantially similar to said second arm slot.

7. The salt block carrier of claim 6, wherein:
a. a first arm arch permits said first securing end to extend into a first arm side;
b. said first arm side extends downwardly into said first knobbed end;
c. said first knobbed end includes a first grip base, said first grip base being adjacent at one end thereof to said first arm side, and having a first grip knob at an oppositely disposed end from said first arm side;
d. a second arm arch permits said second securing end to extend into a second arm side;
e. said second arm side extends downwardly into said second knobbed end; and
f. said second knobbed end includes a second grip base, said second grip base being adjacent at one end thereof to said second arm side, and having a second grip knob at an oppositely disposed end from said second arm side.

8. The salt block carrier of claim 7, wherein:
a. said first knobbed end is at an angle of greater than ninety degrees with said first arm side;
b. said first arm arch has an arc of about 90°;
c. said first grip knob is a rounded and enlarged end of said first knobbed end to permit gripping of said salt block in a first indentation on said salt block;
d. said second knobbed end is at an angle of greater than ninety degrees with said second arm side;
e. said second arm arch has an arc of about 90°;
f. said second grip knob is a rounded and enlarged end of said second knobbed end to permit gripping of said salt block in a second indentation on said salt block; and
g. said first indentation is oppositely disposed from said second indentation.

9. The salt block carrier of claim 8, wherein:
a. said salt block is held within a first arm interior;
b. said first securing end includes a first arm release within said first arm interior;
c. said salt block is held within a second arm interior; and
d. said second securing end includes a second arm release within said second arm interior.

10. The salt block carrier of claim 9, wherein said first arm and said second arm have an I-beam cross-section for at least a portion thereof.

11. The salt block carrier of claim 10, wherein:
a. said first arm release has a generally triangular shape and is situated on said first securing end; and
b. said second arm release has a generally triangular shape and is situated on said second securing end.

12. The salt block carrier of claim 11, wherein:
a. said first base arm mount is trapezoidal in shape and has a larger trapezoid base on said first handle base; and
b. said second base arm mount is trapezoidal in shape and has a larger trapezoid base on said second handle base.

13. The salt block carrier of claim 12, wherein said first arm is symmetrical to said second arm.

14. The salt block carrier of claim 1, wherein:
a. a first handle base includes a first base arm mount on a handle exterior;
b. a second handle base includes a second base arm mount on said handle exterior;
c. said first securing end includes a first arm holder and a first arm base to form a first arm slot to receive therebetween said first base arm mount in a secured fashion;
d. said second securing end includes a second arm holder and a second arm base to form a second arm slot to receive therebetween said second base arm mount in a secured fashion;
e. said first arm holder and said first arm base both include a first arm aperture having a first common axis;
f. said first base arm mount includes therein a first handle aperture;
g. said first arm aperture has said first common axis capable of aligning with said first handle aperture;
h. said second arm holder and said second arm base both include a second arm aperture having a common axis;
i. said second base arm mount includes therein a second handle aperture;
j. said second arm aperture has said second common axis capable of aligning with said second handle aperture;
k. a first arm rod is slidably inserted through and secured in said first arm aperture and said first handle aperture;
l. a second arm rod is slidably inserted through and secured in said second arm aperture and said second handle aperture;
m. said first arm includes a first arm groove adjacent to said first arm slot;
n. said first arm groove extends throughout said first arm down to said first knobbed end;
o. said first arm includes a first arm valley adjacent to said first arm slot;
p. said first arm valley is oppositely disposed from and substantially similar to said first arm slot;
q. said second arm includes a second arm groove adjacent to said second arm slot;
r. said second arm groove extends throughout said second arm down to said second knobbed end;
s. said second arm includes a second arm valley adjacent to said second arm slot; and
t. said second arm valley is oppositely disposed from and substantially similar to said second arm slot.

15. The salt block carrier of claim 14, wherein:
a. a first arm arch permits said first securing end to extend into a first arm side;
b. said first arm side extends downwardly into said first knobbed end;
c. said first knobbed end includes a first grip base adjacent at one end to said first arm side and having a first grip knob at an oppositely disposed end from said first arm side;

d. a second arm arch permits said second securing end to extend into a second arm side;
e. said second arm side extends downwardly into said second knobbed end;
f. said second knobbed end includes a second grip base adjacent at one end to said second arm side and having a second grip knob at an oppositely disposed end from said second arm side;
g. said first knobbed end is at an angle of greater than ninety degrees with said first arm side;
h. said first arm arch has an arc of about 90°;
i. said first grip knob is a rounded and enlarged end of said first knobbed end to permit gripping of said salt block in oppositely disposed salt indentations;
j. said second knobbed end is at an angle of greater than ninety degrees with said second arm side;
k. said second arm arch has an arc of about 90°; and
l. said second grip knob is a rounded and enlarged end of said second knobbed end to permit gripping of said salt block in oppositely disposed salt indentations.

16. The salt block carrier of claim 15, wherein:
a. said salt block is held within a first arm interior;
b. said first securing end includes, as a part of said first release means, a first arm release within said first arm interior;
c. said salt block is held within a second arm interior;
d. said second securing end includes, as a part of said second release means, a second arm release within said second arm interior;
e. said said first arm and said second arm have an I-beam cross-section for at least a portion thereof;
f. said first arm release has a generally triangular shape and is situated on said first securing end; and
g. said second arm release has a generally triangular shape and is situated on said second securing end.

17. The salt block carrier of claim 16, wherein:
a. said first base arm mount is trapezoidal in shape and has a larger trapezoid base on said first handle base;
b. said second base arm mount is trapezoidal in shape and has a larger trapezoid base on said second handle base; and
c. said first arm is symmetrical to said second arm.

18. A salt block carrier for lifting a salt block including a handle, and a first movable arm secured to said handle and a second movable arm secured to said handle, wherein:
a. said first movable arm includes a first securing end to cooperate with a securing means for movably securing said first movable arm to said handle;
b. said first movable arm includes a first gripping means for contacting said salt block oppositely disposed from said first securing end;
c. said second movable arm includes a second securing end to cooperate with a securing means for movably securing said second movable arm to said handle;
d. said second movable arm includes a second gripping means for contacting said salt block oppositely disposed from said second securing end;
e. a first release means for releasing said first movable arm from said salt block;
f. a second release means for releasing said second movable arm from said salt block;
g. said handle includes a grip area, said grip area being generally the portion of said handle in contact with a hand of a person using said salt block carrier;
h. a first handle side is at one end of said grip area;
i. a second handle side is oppositely disposed from said first handle side at an opposing end of said grip area;
j. said grip area extends into said first handle side and said second handle side;
k. said first handle side extends into a first handle base;
l. said second handle side extends into a second handle base;
m. said first handle base and said second handle base meet to complete said handle in cooperation with said first handle side, said second handle side, and said grip area;
n. said handle is shaped substantially pentagonally;
o. said handle includes a handle interior through which a hand is inserted for a purpose of operating said salt block carrier;
p. said handle has a handle exterior oppositely disposed from said handle interior;
q. said handle has an I-beam cross-section;
r. said first handle base includes a first base arm mount on said handle exterior;
s. said second handle base includes a second base arm mount on said handle exterior;
t. said first securing end includes a first arm holder and a first arm base to form a first arm slot to receive therebetween said first base arm mount in a secured fashion;
u. said second securing end includes a second arm holder and a second arm base to form a second arm slot to receive therebetween said second base arm mount in a secured fashion;
v. said first arm holder and said first arm base both include a first arm aperture having a first common axis;
w. said first base arm mount includes therein a first handle aperture; and x. said second arm holder and said second arm base both include a second arm aperture having a second common axis.

* * * * *